United States Patent
Desabhatla

(10) Patent No.: US 8,994,199 B2
(45) Date of Patent: Mar. 31, 2015

(54) SYSTEM AND METHOD FOR DETERMINING CONDUCTIVE STATE OF A SOLID STATE SEMICONDUCTOR DEVICE

(75) Inventor: Sreedhar Desabhatla, Andhra Pradesh (IN)

(73) Assignee: General Electric Company, Schenectady, NY (US)

( * ) Notice: Subject to any disclaimer, the term of this patent is extended or adjusted under 35 U.S.C. 154(b) by 1078 days.

(21) Appl. No.: 13/030,953

(22) Filed: Feb. 18, 2011

(65) Prior Publication Data

US 2012/0211980 A1     Aug. 23, 2012

(51) Int. Cl.
| H02P 9/04 | (2006.01) |
| F02C 7/275 | (2006.01) |
| F02N 11/04 | (2006.01) |
| F02N 11/08 | (2006.01) |
| F02N 11/10 | (2006.01) |

(52) U.S. Cl.
CPC .............. F02N 11/04 (2013.01); F02C 7/275 (2013.01); *F02N 11/0859* (2013.01); *F02N 11/087* (2013.01); *F02N 11/108* (2013.01); *F05D 2260/80* (2013.01)
USPC ............................. 290/40 B; 290/31; 290/7

(58) Field of Classification Search
CPC . F05D 2260/80; F02N 11/108; F02N 11/087; F02N 11/0859; F02N 11/04; F02C 7/275
USPC ...................... 290/30, 31, 7, 40 B; 322/20, 24
See application file for complete search history.

(56) References Cited

U.S. PATENT DOCUMENTS

| 3,617,860 | A | * | 11/1971 | Williams et al. | ............... 323/351 |
| 3,959,704 | A | * | 5/1976 | McCrea | ........................ 318/809 |
| 4,133,018 | A | | 1/1979 | Terunuma et al. | |
| 4,745,513 | A | | 5/1988 | McMurray | |
| 4,785,388 | A | * | 11/1988 | Takahashi | ........................ 363/68 |
| 4,819,116 | A | | 4/1989 | Piteo | |
| 5,093,630 | A | * | 3/1992 | Sato | ............................... 323/210 |
| 5,374,881 | A | | 12/1994 | Post et al. | |
| 5,633,788 | A | * | 5/1997 | Tanaka et al. | ................... 363/41 |
| 7,164,564 | B1 | | 1/2007 | Finlay, Sr. et al. | |
| 2011/0289934 | A1 | * | 12/2011 | Desabhatla | ..................... 60/778 |

FOREIGN PATENT DOCUMENTS

EP     0271687     6/1988

OTHER PUBLICATIONS

GE Energy; LS2100 Static Starter Product Description; GEI-00539; 2002 by General Electric Company.
GE Energy; LS2100 Static Starter Control User Guide; GEH-6679B; 2005-2008 General Electric Company, USA. Revised: 080905; Issued: 050224.

* cited by examiner

*Primary Examiner* — Julio C. Gonzalez R.
(74) *Attorney, Agent, or Firm* — Fletcher Yoder, P.C.

(57) ABSTRACT

A system, in one embodiment, may include a static starter subsystem having detection logic for indicating a conductive state of a solid state semiconductor device. The detection logic includes a first logic gate having a first input that receives a first input signal indicating a state of the static starter subsystem, a second input that receives a second input signal indicating a state of a gate firing command being applied to the solid state semiconductor device, and a third input that receives a third input signal indicating whether the solid state semiconductor device is conducting. The first logic gate may be configured to evaluate the first, second, and third input signals and provide a first output signal indicating conductivity of the solid state semiconductor device in response to the gate firing command.

22 Claims, 6 Drawing Sheets

SYSTEM AND METHOD FOR DETERMINING CONDUCTIVE STATE OF A SOLID STATE SEMICONDUCTOR DEVICE

BACKGROUND OF THE INVENTION

The subject matter disclosed herein relates generally to static starter systems and, more particularly, to systems and methods for determining the state of a solid state semiconductor device that may be used in such static starter systems.

In some gas turbine systems, a gas turbine may need to be started and accelerated to a desired speed profile on relatively short notice. The speed profile may be one that provides desired starting conditions for the gas turbine. In such applications, a static starter system may be provided in conjunction with an electrical generator acting as a synchronous motor, which may be operatively coupled to a shaft of the gas turbine. During the starting sequence of the gas turbine system, the static starter system may deliver a variable frequency current to drive and control the electrical generator (e.g., by modulating exciter field voltage and/or stator current), which in turn drives the main shaft of the gas turbine into rotation. Once the static starter system has accelerated the gas turbine to a desired speed (e.g., matching the desired speed profile, which may represent a self-sustaining speed), the static starter system may disengage and electrically disconnect from the generator as the gas turbine enters normal (e.g., self-sustaining) operation.

To provide the variable frequency current to the generator, static starter systems may include power conversion circuitry. For instance, the power conversion circuitry may include multiple strings of solid state semiconductor switches, such as thyristors, arranged within source and load bridges to produce a variable frequency AC output that is supplied to the generator. Control circuitry may provide gate firing signals to the solid state switches, which may transition to a conductive state when a gate pulse is received. During operation, error conditions may occur which may result in one or more solid state switches failing to conduct properly. Thus, in a string of series-connected solid state switches, the failure of one switch to conduct properly may result in the entire string not conducting. In existing static starter systems, it is difficult to detect and identify non-conducting solid state switches (e.g., using multimeters or other measuring instrumentation) during system operation, which may complicate troubleshooting and repair procedures. Disadvantageously, troubleshooting procedures in existing static starter systems may require an operator to power off the static starter system and to test each solid state switch using a trial and error technique to identify a non-conducting switch, which is not only inconvenient, but may undesirably result in equipment downtime.

BRIEF DESCRIPTION OF THE INVENTION

In one embodiment a system includes a static starter subsystem having detection logic for indicating a conductive state of a solid state semiconductor device. The detection logic may include a first logic gate having a first input configured to receive a first input signal, wherein the first input signal indicates a state of the static starter subsystem, a second input configured to receive a second input signal, wherein the second input signal indicates a state of a gate firing command being applied to the solid state semiconductor device, and a third input configured to receive a third input signal, wherein the third input signal indicates whether the solid state semiconductor device is conducting. The first logic gate may evaluate the first, second, and third input signals and provide an output signal that indicates conductivity of the solid state semiconductor device in response to the gate firing command.

In another embodiment, a system includes a gas turbine, an electrical generator, and a static starter. The static starter may provide a variable frequency AC signal to drive the electrical generator during a starting sequence of the gas turbine. The static starter may include a power conversion module having a plurality of solid state switches configured to receive an initial AC input signal, convert the AC input signal into a DC signal, and convert the DC signal into the variable frequency AC signal. The static also includes control logic configured to provide gate firing commands to each of the plurality of solid state switches. Further, each of the plurality of solid state switches may be coupled to a respective status detection circuit configured to determine if a solid state switch transitions to a conductive state when a gate firing command is sent to the solid state switch while the static starter is running during the starting sequence.

In a further embodiment, a static starter system includes a power conversion module having a source bridge converter with a first set of solid state switches and a load bridge converter with a second set of solid state switches. The source bridge converter may be configured to receive and convert a three-phase AC input signal into a DC signal, and the load bridge converter may be configured to receive and convert the DC signal into a variable frequency three-phase AC signal. The static starter system further includes control logic having a controller configured to generate gate firing commands for each of the first and second sets of solid state switches. The control logic also includes gate pulse amplifier circuitry that may generate gate pulses for each of the first and second sets of solid state switches based on the gate firing commands, wherein the gate pulse amplifier circuitry includes, for each solid state switch, detection logic configured to monitor a state of a respective solid state switch. The detection logic may include an AND logic gate having a first input that receives a first input signal indicating an operating state of the static starter, a second input that receives a second input signal indicating a state of the gate firing command sent to the solid state switch, and a third input that receives a third input signal indicating the conductivity of the solid state switch. The AND logic gate may provide an output signal based on the states of the first, second, and third input signals, and the detection logic may provide a status signal based on the output signal, wherein the status signal is indicative of a conductive state of the solid state switch.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION OF THE INVENTION

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements.

As discussed further below, certain embodiments provide techniques for improving the ease of detecting non-conducting solid state switching devices, which may be implemented in variety of applications, such as a power converter. As used herein, the term non-conducting shall be understood to refer to a state in which a solid state switching device fails to conduct when expected. For instance, such a condition may occur when the solid state which fails to conduct despite receiving a firing command In the case of a non-conducting solid state switch, the status detection logic may feed back the non-conducting status to a controller, which may enable an operator to quickly identify and address non-conducting switches while also reducing equipment downtime in the event that one or more switches become non-conducting.

Figure 1:
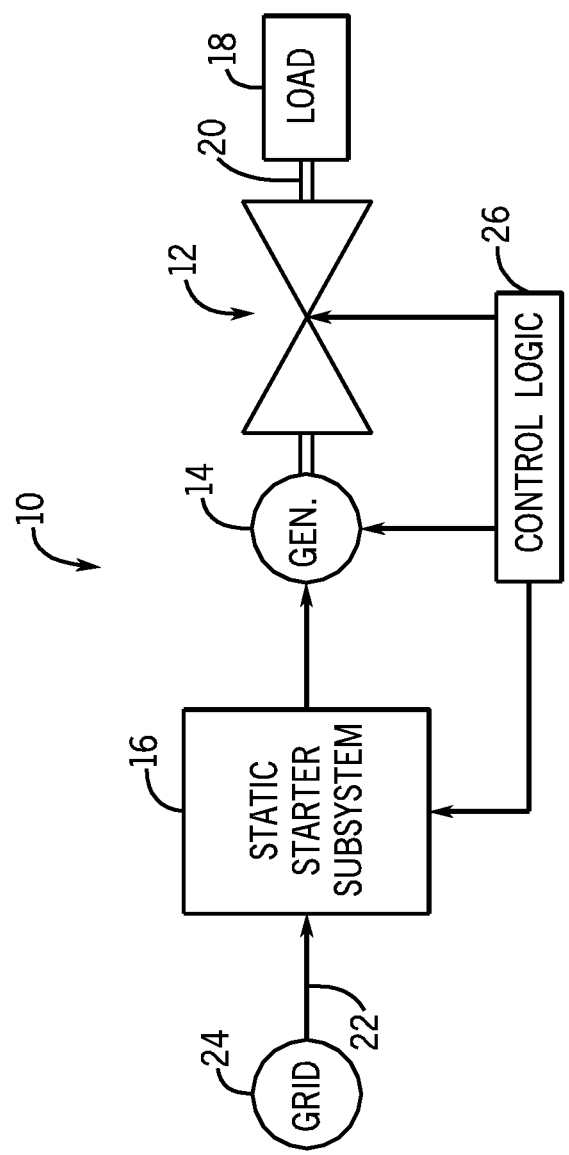
FIG. 1 is a simplified system diagram depicting an embodiment of a turbine-generator system that includes a static starter subsystem.

With these points in mind, FIG. 1 provides a simplified system diagram showing an embodiment of a turbine-generator system 10 that includes a gas turbine 12, a generator 14, and a static starter subsystem 16. In self-sustaining operation, combustion gases generated by the gas turbine 12 may cause one or more turbine blades of the gas turbine 12 to drive a main shaft 18 into rotation. As shown, the shaft 18 may be coupled to a load 20 that may be powered via rotation of the shaft 18. By way of example, the load 20 may be any suitable device that may generate power via the rotational output of the turbine-generator system 10, such as an external mechanical load or a power generation plant. For instance, in some embodiments, the load 20 may include an electrical generator, a propeller of an airplane, and so forth.

During a starting sequence of the turbine-generator system 10 (e.g., when the turbine 12 is initially started up from a generally stationary position), the static starter subsystem 16 may function as a variable speed AC drive system that drives the generator 14 as a synchronous motor. For instance, the static starter 16 may include a power conversion module that receives AC power from a source, such as power grid 24, via an AC bus 22 and provides variable frequency AC power to drive the generator 14. Thus, the generator 14 and static starter 16 may operate collectively to accelerate the turbine 12 in accordance with a desired speed profile that provides desired starting conditions for the turbine 12. For instance, in one embodiment, a desired starting condition may be one in which the turbine 12 reaches a speed such that it is capable of self-sustaining operation independent from the generator 14 and static starter 16 via its own combustion processes. Once a desired speed is achieved, the static starter 16 may disengage from the generator 14 while the turbine 12 continues to operate independently of the static starter 16. As can be appreciated, the use of static starter subsystem 16 and generator 14 may be beneficial in that it reduces the need for a separate starting device, such as an electric motor or diesel engine, and also reduces the need for torque converters associated with such auxiliary hardware, thus not only reducing overall component cost, but also freeing up space in the vicinity of the turbine unit 12 and reducing the overall form factor of the turbine system 10.

Additionally, the turbine-generator system 10 may also include control logic 26, which may provide various control parameters to each of the turbine 12, the generator 14, and the static starter subsystem 16. For instance, the control logic 26 may provide generate firing commands for solid state semiconductor switching devices, such as thyristors, that may be included in the power conversion module of the static starter 12. As discussed further below, the control logic 26, in accordance with aspects of the present disclosure, may also include logic and/or circuitry for detecting the conductive status of such solid semiconductor devices.

Figure 2:
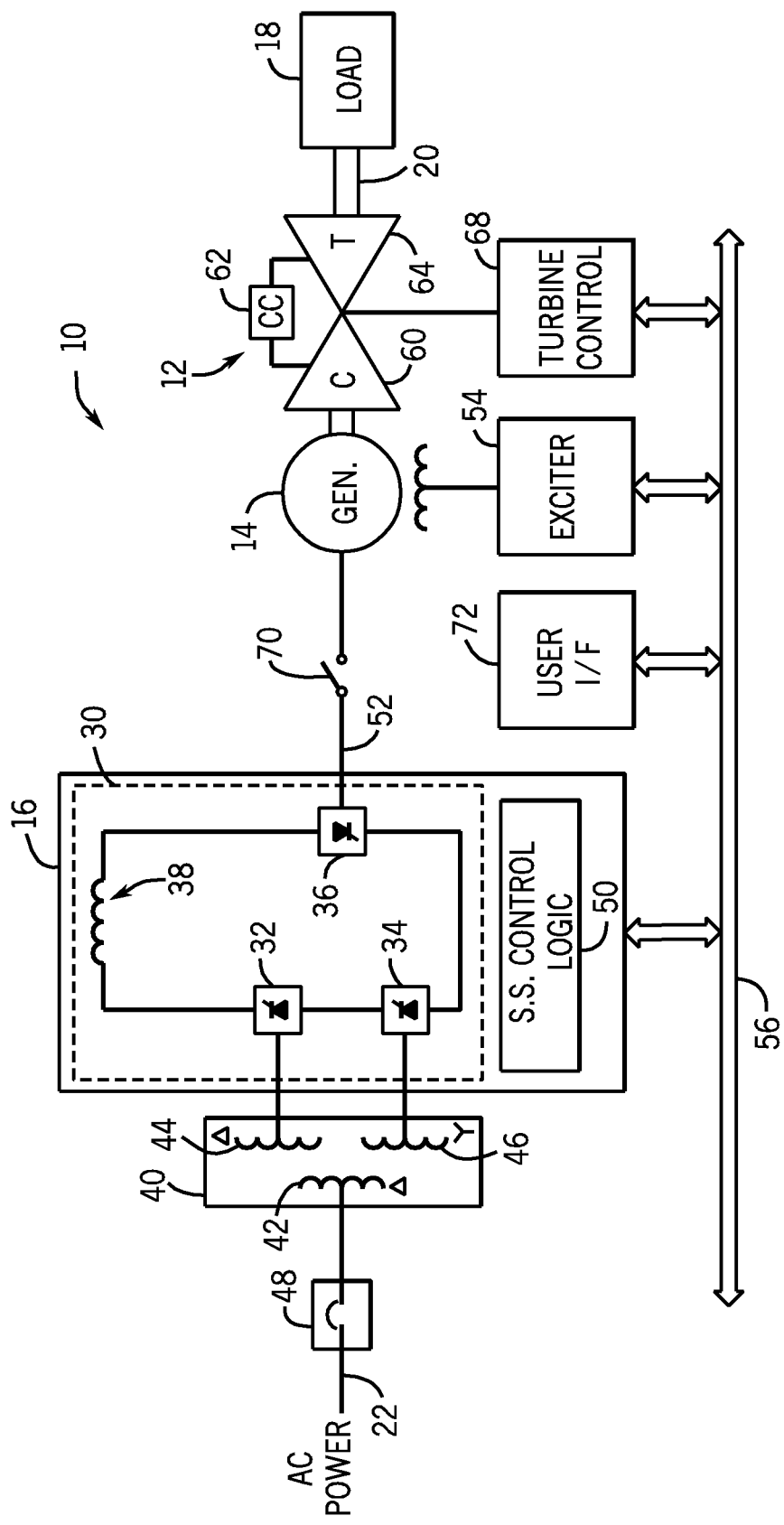
FIG. 2 is a block diagram illustrating the turbine-generator system of FIG. 1 in more detail.

Referring to FIG. 2, the embodiment of the turbine-generator system 10 depicted in FIG. 1 is illustrated in further detail. Particularly, FIG. 2 depicts in further detail certain components that may be present in an embodiment of the static starter subsystem 16, as well as various control units that may collectively make up the control logic 26 of the system 10, as shown in FIG. 1. As discussed above with reference to FIG. 1, during a starting sequence of the turbine-generator system 10, the static starter 16 may operate as a variable speed AC drive system to provide variable AC power to the generator 14. In the present embodiment, the static starter 16 may include a power conversion module 30 having two series-connected source bridge converters (e.g., rectifiers) 32, 34, a load bridge converter (e.g., inverter) 36, and a DC link reactor 38. As shown, the source bridges 32, 34 feed the load bridge 36 through the DC link reactor 38.

The main input power from the AC bus 22 to the power conversion module 30 may be provided through an isolation transformer 40 to deliver three-phase AC input power to each of the source bridges 32, 34. The isolation transformer 40, which may be connected to the AC bus 22 by a circuit breaker 48, may provide correct voltage and phasing to the input terminals of the source bridge rectifiers 32, 34, as well as isolation from the AC bus 22. As shown, three-phase AC power (e.g., from grid 24 of FIG. 1) is provided along the AC bus 22 to a primary winding 42 of the isolation transformer 40. The isolation transformer 40 also includes two secondary windings, including a delta-connected secondary winding 44, which feeds the source bridge 32, and a wye-connected secondary winding 46, which feeds the source bridge 34. In the present embodiment, this arrangement may result in the three-phase AC inputs to each source bridge converter 32, 34 being offset by 30 degrees with respect to one another, and may also reduce unwanted harmonics in the power conversion module 30.

The source bridges 32, 34 may be line-commutated and phase-controlled thyristor bridges that, upon receiving inputs from the secondary windings 44, 46, respectively, of the isolation transformer 40, produce a variable DC voltage output to a DC link reactor 38. The DC link reactor 38 may provide inductance to smooth the current provided by the source bridges 32, 34 and to keep the current continuous over the operating range of the system while also reducing harmonics. In one embodiment, the DC link reactor 38 may include an air core inductor. The output of the DC link reactor 38 may then be provided to the load bridge 38, which may be a load-commutated thyristor bridge configured to provide a variable frequency AC output, represented here by reference number 52. The static starter subsystem 16 includes control logic 50 (may be part of the control logic 26 of FIG. 1), which may provide signals to control the operation of the thyristors of the source bridges 32, 34, and the load bridge 36. For instance, the control logic 50 may generate and provide gate firing commands to the thyristors of the source and load bridges (32, 34, 36) in accordance with an appropriate timing. Additionally, as will be discussed further below, the control logic 50 may include detection logic that may be configured to monitor each thyristor and to detect if a particular thyristor is or becomes non-conducting.

Further, while shown in FIG. 2 as being separate from the power conversion module 30, in certain embodiments, the control logic 50 may be at least partially integrated with the power conversion module 30. Additionally, though not depicted in FIG. 2, the static starter subsystem may include a cooling system, such as a closed-loop liquid cooling system utilizing a coolant flow that may transfer heat away from heat producing devices, such as the thyristors of the source and load bridges (32, 34, 36). For instance, a liquid cooled heat sink may be provided for each thyristor in the bridges 32, 34, and 36.

The variable frequency AC output 52 from the load bridge 36 may be provided to one or more stator terminals of the generator 14 during the starting sequence of the turbine-generator system 10. Additionally, the static starter 16 may also provide a field voltage reference to an exciter 54 (which may be part of control logic 26 of FIG. 1) using a networked communication path 56. For instance, the networked communication path may be a local area network (LAN) (e.g., based on Ethernet, fiber optic cable, etc.), or may be a wireless network based on any suitable protocol, such as 802.11. The exciter 54 that may supply the voltage to a rotor disposed within the stator to control the generator field. In this manner, the generator 14 may operate as a synchronous motor during the starting sequence of the system 10. In some embodiments, the output 52 of the static starter subsystem 16 may be used to drive multiple generators, which may each drive separate turbines or may drive the same turbine in a redundant manner (e.g., one generator may serve as a backup in case a primary generator fails).

During the starting sequence of the system 10, the generator 14, operating as a synchronous motor, may provide torque to drive the shaft 20 of the turbine 12 into rotation from a stationary position. For instance, the generator 14 may drive the shaft 20 directly or indirectly (e.g., via one or more additional shafts and/or gears coupled to the shaft 20). Typically, the generator 14 spins the shaft 20 until there is a sufficient of air passing through the compressor section 60 and into a combustion chamber 62. Fuel, which may include liquid or gas fuel, such as a natural gas and/or hydrogen-rich synthetic gas, may be provided to the combustion chamber 62 via one or more fuel nozzles, resulting in an air-fuel mixture. Although only a single combustion chamber is depicted in FIG. 2 for simplicity, it should be appreciated that the turbine 12 may include multiple combustion chambers 62.

The air fuel mixture may be combusted, and the resulting hot pressurized combustion gases may pass through a turbine section 64 of the gas turbine 12 as exhaust gases. The turbine section may include multiple turbine blades which are coupled to the shaft 20. Combustion gases passing through the turbine section may force the turbine blades to rotate the shaft 20 along its rotational axis. Thus, the rotational force exerted on the shaft 20 by the turbine blades may supplement the torque provided by the generator 14, thereby increasing the rotational speed of the shaft 20. The compressor section 60 may also includes compressor blades coupled to the shaft 20. Thus, as the shaft 20 rotates, the compressor blades also rotate and may draw air into the compressor section 60 via an air intake of the turbine 12. As can be appreciated, during the starting sequence, the rotational speed of the shaft 20 may gradually increase as a result of torque provided by the generator 14 as well as the rotational force exerted on the shaft 20 as the turbine blades are driven into rotation by exhaust combustion gases. During the starting sequence, the fuel flow to the combustion chamber 62 may also be increased to gradually drive the turbine 12 up to a desired operating speed to drive the load 18.

As can be appreciated, once the turbine 12 is accelerated to a desired speed, which may be a speed sufficient for self-sustaining operation, the starting sequence may conclude and the static starter subsystem 16 may disengage. For instance, in the embodiment of FIG. 2, a turbine control unit 68 may interface with one or more sensors to monitor the operation of the turbine 12 and provide the sensor data as feedback to the static starter control logic 50. For instance, the data may include various turbine operation parameters, such as shaft speed, flame detection, vibration and pressure data, and so forth. When the feedback sensor data indicates that the turbine 12 has reached a speed sufficient for maintaining self-sustaining operation (e.g., a desired rotational speed of the shaft 20), the static starter subsystem 16 may disengage from the turbine-generator set by decoupling the load bridge output 52 from the generator 14. In the illustrated embodiment, a disconnect switch 70 is provided on the output bus of the load bridge 36. At the conclusion of the starting sequence (e.g., when self-sustaining operation is achieved), the static starter subsystem 16 may disengage by opening the switch 70, which may be accomplished by the control logic 50 and/or the turbine control unit 68. Further, during self-sustaining operation, the turbine control unit 68 may continue operating the turbine 12 in accordance with one or more desired speed profiles. For instance, the turbine control unit 68 may modulate one or more turbine operation parameters, such as fuel flow rate, to achieve a desired speed profile.

Also provided in the embodiment of FIG. 2 is a user interface 72, which is shown as being communicatively coupled to the networked communication path. The user interface 72 may be a human-machine interface (HMI) device, such as a computer workstation with a visual display and input devices, such as a keyboard and/or mouse. Using the user interface 72, an operator may initiate commands, view real-time data and/or alarms, as well as interact with various tools and utility programs pertaining to turbine system operation. Further, it should be understood that the user interface 72 may be located within the general proximity of the system 10, or may be remotely located and communicate with the system 10 via the network 56.

Figure 3:
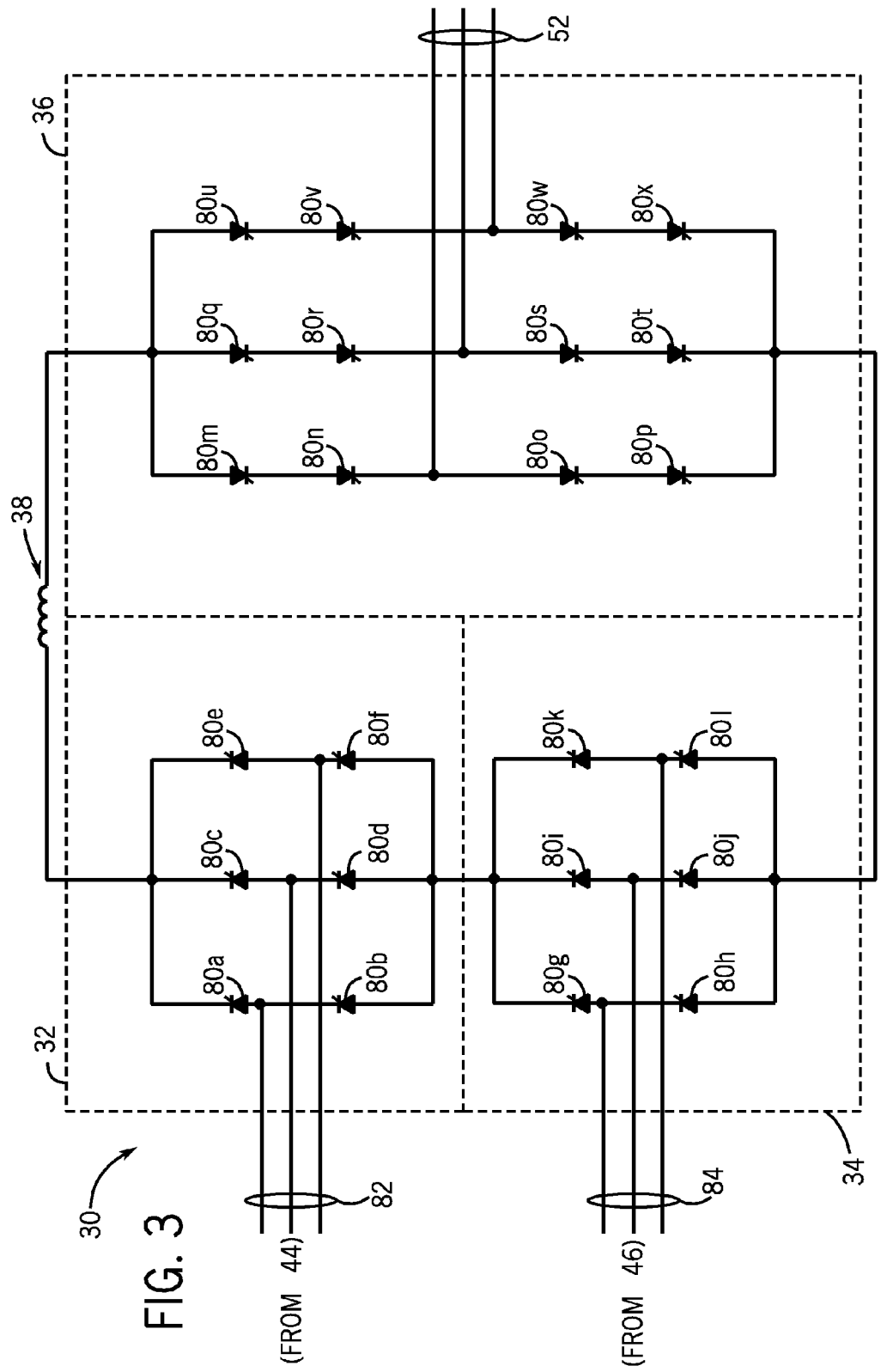
FIG. 3 is a schematic diagram showing an embodiment of a power conversion module that may be implemented in the static starter subsystem of FIG. 2.

Having provided a general overview regarding the operation of the turbine-generator system 10 from a starting sequence into self-sustaining operation, the present description will now provide additional details regarding the power conversion module 30 and the static starter control logic 50 shown in FIG. 2. For instance, referring to FIG. 3, an embodiment of the power conversion module 30 that includes the source bridges 32, 34 and the load bridge 36 is illustrated in further detail. As shown in FIG. 3, the source bridges 32, 34 are coupled in series. As discussed in FIG. 2, the AC input for each of the source bridges 32, 34 may be supplied from the delta-wye secondary windings of the isolation transformer 40. For instance, the source bridge 32 may receive a three-phase AC input 82 from the delta secondary 44 of the isolation transformer, and the source bridge 34 may receive a three-phase AC input 84 from the wye secondary 46 of the isolation transformer 40. As discussed above, the source bridges 32 and 34 may be line-commutated and phase controlled. In one embodiment, the AC inputs 82 and 84 to the source bridges 32 and 34, respectively, may be approximately 2080 Vac.

Each of the source bridges 32, 34 are depicted in this embodiment as being three-phase full-wave thyristor bridges, each having six thyristors arranged as shown in FIG. 3. For instance, the source bridge 32 may include the thyristors 80a-80f, and the source bridge 34 may include the thyristors 80g-80l. Thus, collectively, the source bridge 32 and the source bridge 34 may provide a 12-pulse source bridge rectifier. Additionally, the load bridge 36 may include twelve thyristors 80m-80x, arranged as depicted in FIG. 3. In the present embodiment, the load bridge 36 may be a load-commutated inverter. As can be appreciated, the series connection of the source bridge 32 and the source bridge 34 allow for sharing of the bus so that the source bridges 32, 34 may be summed together to provide a DC voltage to the DC link reactor 38. The summed DC voltage is converted back into a three-phase AC signal using the load bridge 36, to produce the variable frequency AC signal 52 that is provided to the generator 14 during the starting sequence of the system 10. In one embodiment, the output 52 provided by the load bridge 36 may be approximately 4160 Vac.

While the thyristors 80 are depicted as the switching elements of the source bridges 32, 34 and the load bridge 36, it should be appreciated that any suitable type of solid state switching device may be implemented in the power conversion module. For instance, as discussed below in FIG. 4, the thyristors 80 may be silicon controlled rectifiers (SCRs) in one embodiment. In other embodiments, the thyristors 80 may include gate turn-off thyristors (GTO), triode AC switches (TRIAC), MOS controlled thyristors (MCT), integrated gate commutated thyristors (IGCT), static induction thyristors (SITh), and so forth.

Additionally, it should also be understood that the configuration and arrangement of thyristors source (32, 34) and load (36) bridges illustrated in FIG. 3 is only intended to illustrate one possible embodiment, and that in other embodiments, various other configurations of solid state switches may be used. For instance, while the present embodiment illustrates each leg of the source bridges as having one switch (e.g., switch 80a and switch 80b may correspond to first and second legs for one phase of the three-phase AC input 82), other embodiments may provide two or more switches for each leg of a source bridge. For instance, in one such embodiment, a source bridge (32 or 34) may include 12 switches, with two switches per leg, 18 switches with three switches per leg, or 24 switches with four switches per leg, and so forth. Similarly, while the load bridge 36 is depicted with two switches 80 per leg (e.g., switches 80m and 80n making up one leg), other embodiments of the load bridge 36 may utilize fewer or greater than two switches 80 per leg.

As will be appreciated, control circuitry (e.g., control logic 50) may supply firing commands to each of the thyristors 80 of the source bridges 32, 34 and the load bridge 36 during power conversion. The gate firing commands are timed to govern when each thyristor 80 is switched on to a conductive state during each gate firing pulse in a line cycle, for instance.

For example, the gates of the source bridge thyristor switches (80a-80l) may be digitally controlled to produce a desired current through the DC link 38 and the load. Additionally, the gates of the load bridge thyristor switches (80m-80x) may be digitally controlled to produce a variable frequency AC output current that is sent to the generator stator terminals. As discussed further below, the control logic 50 may also implement detection logic that may monitor each thyristor 80 of the power conversion module 30 and identify a particular thyristor or thyristors 80 that become non-conductive during operation.

Figure 4:
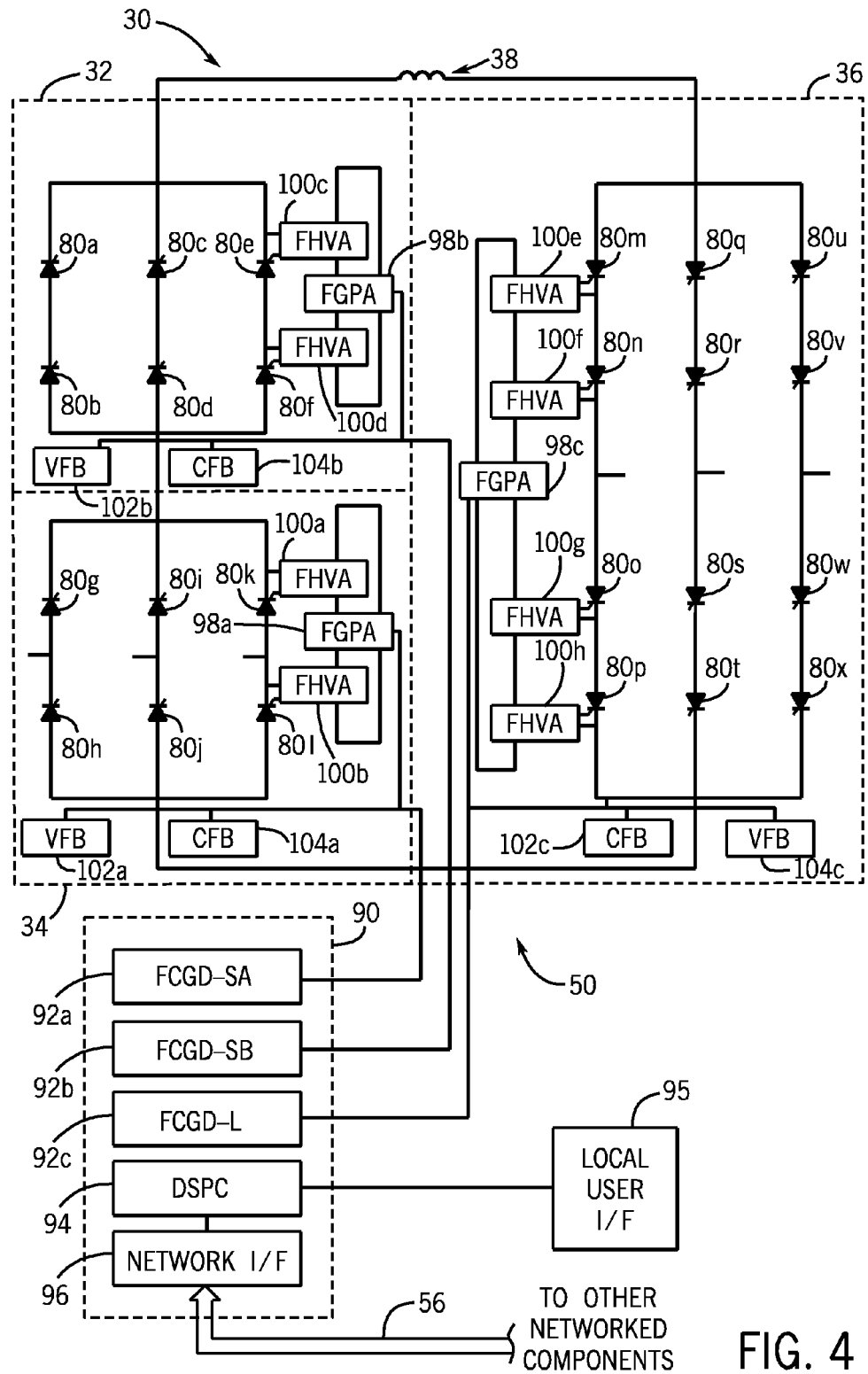
FIG. 4 is a schematic diagram showing control logic coupled to the power conversion module of FIG. 3.

Referring to FIG. 4, the power conversion module 30 shown in FIG. 3 is illustrated with the control logic 50 integrated thereto. As shown, the control logic 50 may include a main control unit 90, which may include multiple control boards arranged in a rack configuration. In the present embodiment, the main control unit 90 may include bridge interface boards (FCGD) 92a, 92b, and 92c that may control the source bridge 32, the source bridge 34, and the load bridge 36, respectively. The main control unit 90 also includes a digital signal processor control board (DSPC) 94. The DSPC 94 may be processor-controlled main control board having circuitry configured to provide bridge firing signals to drive the thyristors 80, which may be SCRs in the present embodiment. The DSPC 94 may also include current and voltage regulator functions, a clocking circuit, such as a phase locked loop (PLL) for timing purposes, as well as logic for detecting and indicating alarm and trip conditions. The bridge firing signals generated by the DSPC 94 may include gate firing commands for the SCRs of the source bridges 32, 34 and of the load bridge 36. The DPSC 94 may also provide the field reference voltage data that is supplied to the exciter 54 (FIG. 2).

In the present embodiment, the DSPC 94 may be coupled to a local user interface 95, such as a local workstation. An operator may thus supply commands and/or manipulate operation parameters using the local workstation 95. Additionally, an operator may also interface with the control logic 50 using the networked user interface 72 shown in FIG. 2. For instance, the main control unit 90 includes a network interface 96 that may connect the control logic 50 to the network 56. As discussed above, the network 56 may provide a communication path between each of the control logic 50, user interface 72, excited 54, and turbine control unit 68. The gate firing commands generated by the DSPC 94 for each bridge of the power conversion module 30 may be received by a respective bridge interface board (FCGD) 92, which then controls the switching of the SCRs of a corresponding bridge. For instance, the FCGD board 92a may provide gate firing signals to source bridge 34, the FCGD board 92b may provide gate firing signals to the source bridge 32, and the FCGD board 92c may provide gate firing signals to the load bridge 36.

As shown in FIG. 4, several components of the control logic 50 may also be distributed within the power conversion logic 30 to provide an interface between the main control unit 90 and the power conversion bridges 32, 24, and 36. For instance, referring to the source bridge 34, gate firing commands for the SCRs 80g-80l are sent from the FCGD board 92a to gate pulse amplifier logic boards (FGPA) 98 coupled to each input phase of the three-phase AC input (e.g., input 84). For instance, the SCRs 80k and 80l, which represents one phase of a three-phase AC input (e.g., input 84), may be coupled to an FGPA board 98a. Similarly, the set of SCRs 80i and 80j and the set of SCRs 80g and 80h may be coupled to separate respective FGPA boards 98 in a manner similar to the SCRs 80k and 80, although these are not illustrated in FIG. 4 for purposes of clarity. Nevertheless, it should be understood that each input phase of a source bridge and each output phase of a load bridge may be provided a respective FGPA board that provides gate firing commands corresponding to that phase.

FIG. 4 also illustrates the FGPA board 98b coupled to the SCRs 80e and 80f of one input phase of the source bridge 32, and the FGPA board 98c coupled to the SCRs 80m-80p of one output phase of the load bridge 36. Again, it should be understood that while not illustrated for purposes of clarity, separate respective FGPA boards may be coupled to the SCRs 80c-80d and to the SCRs 80a-80b of the source bridge 32, and that separate respective FGPA boards may be coupled to the SCRs 80q-80t and the SCRs 80u-80x of the load bridge 36.

The FGPA boards 98 may provide an interface between the main control unit 90 and each of the bridges 32, 34, and 36 of the power conversion module 30. For instance, the FGPA boards 98 may receive the gate firing commands from a corresponding FCGD board 92 and convert the gate firing commands into voltage and current pulses that may be supplied to its corresponding SCRs 80. In certain embodiments, the gate firing commands may be routed from the FCGD board 92 to corresponding FGPA boards 98 using fiber optic data communication paths (e.g., fiber optic cabling). In the embodiment depicted in FIG. 4, each SCR 80 may be coupled to an FGPA board 98 by way of an intervening high voltage gate interface board (FHVA) 100. For instance, referring to the source bridge 34, the SCRs 80k and 80l may be coupled to the FGPA board 98a by way of the FHVA boards 100a and 100b, respectively. The FHVA boards 100 may be configured to provide a gate interface by which an isolated path for gate power from the FGPA board 98 may be provided to a corresponding SCR 80. In certain embodiments, the FHVA boards 100 may include a current transformer to provide the gate interface. During operation of the power conversion module 30, each FGPA board 98 may supply gate power of sufficient magnitude and duration for one phase of a power bridge by transmitting pulses to the SCRs 80 via corresponding FHVA boards 100. In one embodiment, the FGPA boards 98 may include an on-board AC/DC converter that provides the gate power.

Each FCGD interface board 92 shown in FIG. 4 may also be coupled to a voltage feedback logic (VFB) 102 and a current feedback logic (CFB) 104. In certain embodiments, the VFB logic 102 may provide voltage feedback scaling of bridge AC and DC voltages. The voltage feedback information is provided to a corresponding FCGD interface board 92. The CFB logic 104 may provide a common termination point between bridge current sensing devices and the control interface boards (FCGD), and may also provide for interconnection and safety functions.

As discussed above, the control logic 50 of the static starter subsystem 16 may include logic to determine the conductive state of each SCR 80 and to detect and identify if a particular SCR 80 becomes non-conducting during operation. As defined above, a non-conducting state may generally refer to a state in which the solid state switching device (e.g., SCR) is expected to but fails to conduct for some reason. This may include failure of the SCR to conduct despite receiving a sufficient current pulse at its gate, failure of the SCR to conduct due to a gate pulse being too weak (e.g., below the switching threshold voltage), and/or failure of the SCR to conduct due to a gate pulse not being received at all at an expected time. Thus, an SCR 80, as shown in FIG. 4, is generally expected to show an open state (e.g., non-conducting) when no pulse is being applied to the gate and a short or closed stated (e.g., conducting) when a pulse is applied. Thus, a non-conducting state may refer to one in which the behavior of an SCR 80 deviates from expected operation.

As can be appreciated, various reasons may cause a solid state switch, to become non-conducting. For instance, an SCR 80 itself may become defective or damaged during operation, which may result in an open leg in the power conversion module 30. Additionally, failures or defects may also occur in the bridge interface boards 92 (FCGD), the gate pulse amplifier boards (FGPA) 98, and/or the connective cabling (e.g., fiber optics) between components of the control logic 50 and/or the SCRs 80, which may also render the SCRs 80 non-conducting by preventing a gate firing command from reaching the gate of an SCR and, thereby preventing SCR from firing due to a weak and/or missing gate pulse. As discussed above, when such failures occurs in certain conventional static starter systems, it is often difficult to quickly identify which particular SCR has become non-conducting. For instance, in some conventional static starter systems, an operator or maintenance worker may have to evaluate that conductive status of each SCR using measuring instrumentation, such as a multi-meter, which generally cannot be performed while a static starter drive is running Accordingly, as discussed below, embodiments of the static starter system 16 described herein may provide status detection logic that allows the static starter system 16 to quickly identify non-conducting SCRs.

Figure 5:
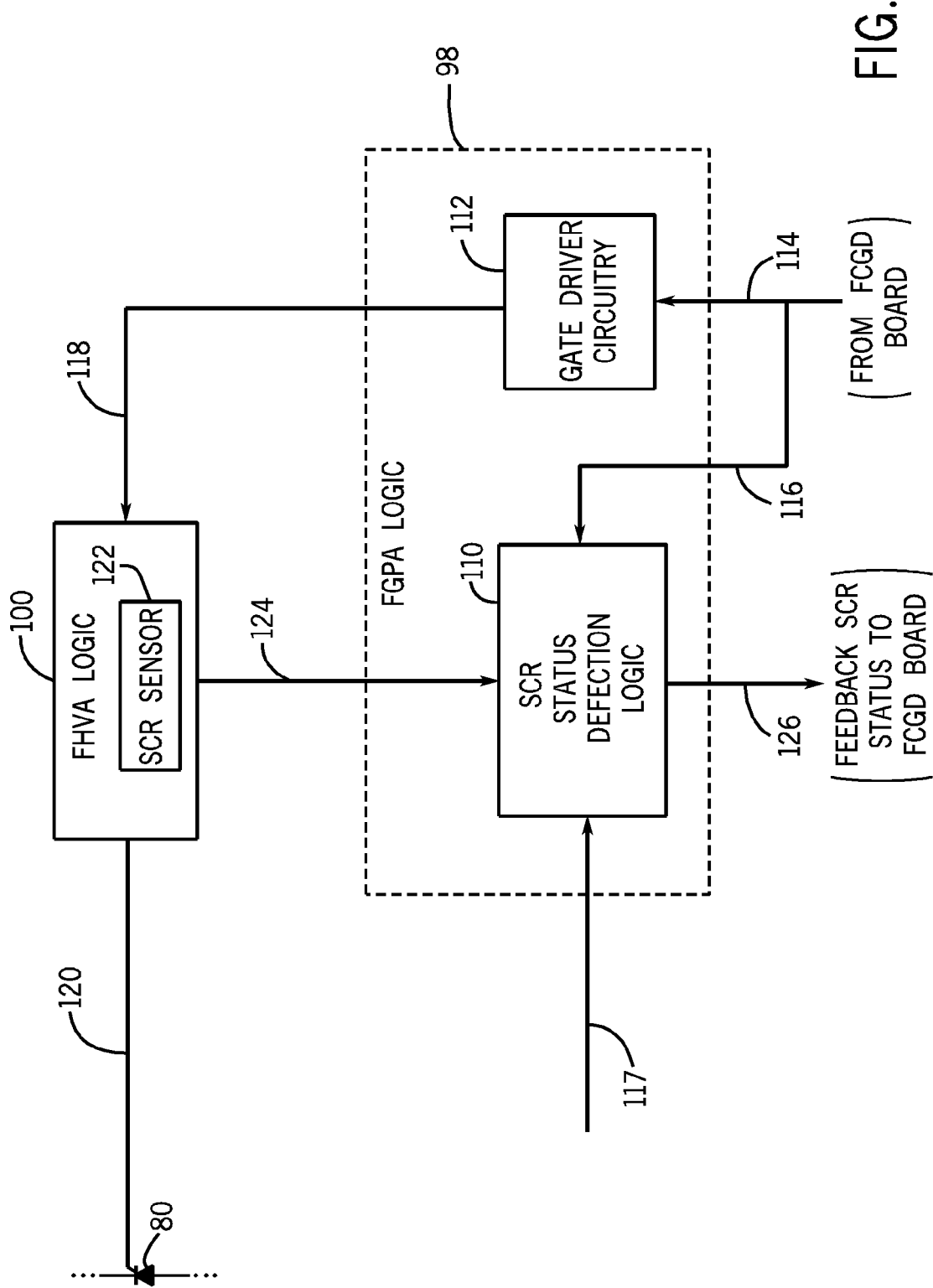
FIG. 5 is block diagram illustrating an embodiment of a gate pulse amplifier board that includes detection logic for detecting the conductive status of a solid state switch of the power conversion module of FIG. 4.

Referring to FIG. 5, a simplified block diagram showing an embodiment of an FGPA board 98 of the control logic 50 is illustrated. The FGPA board 98 of FIG. 5 includes an SCR status detection logic 110 and gate driver circuitry 112. The FGPA board 98 receives gate firing commands, represented here by signal 114, from a corresponding FCGD board 92 and, using the gate driver circuitry 112, converts the gate firing commands 114 into voltage and current pulses 118. The pulses 118 are sent to the FHVA logic 100 associated with the SCR 80, which may provide an interface by which the pulse may be delivered to the gate of the SCR 80, as indicated by the signal 120.

In the illustrated embodiment, the FHVA board 100 associated with the SCR 80 includes a sensor 122 that may be configured to detect the conductive state of the SCR and provide a signal 124 that is fed back to the SCR status detection logic 110 of the FGPA board 98. As illustrated in FIG. 5, the SCR status detection logic 110 also receives the signal 116, which may be provided from the FCGD board 92 and may be indicative of whether there is an active ("on") firing command being provided to the SCR 80, and the signal 117, which may be represent an on or off state of the static starter subsystem 16. For instance, the signal 117 may indicate whether the static starter variable speed drive is running, which may depend on whether the turbine-generator system 10 is operating during a starting sequence. The SCR status detection logic 110 may evaluate the states of each of the received signals, namely signal 124 (representing the SCR conductive state), signal 116, and signal 117. Based on the states of these signals, the output signal 126 is fed back to the FCGD board 92, which may provide the SCR conduction status information to the main controller (DSPC) 94. For instance, the SCR conduction status signal 126 may be fed back to the FCGD board 92 using fiber optic data paths. In certain embodiments, when an SCR 80 is detected as having become non-conducting, an appropriate warning or alarm may be sent and displayed on a user interface, such as the local user interface 95 or the networked user interface 72, which may alert an operator of the non-conducting status so that troubleshooting and/or repair procedures may be initiated.

Before continuing, it should be understood that the FGPA logic 98 illustrated in FIG. 5 is simplified in the sense that only a single FHVA board 100 and single SCR 80 are shown as being interfaced with the FGPA board. In an actual implementation, it should be understood that the FGPA logic 98 may actually interface with multiple SCRs 80 by way of multiple respective FHVA boards 100, and that for each SCR 80, the SCR status detection logic 110 of the FGPA board 98 may be configured to provide a separate SCR conduction status signal 126. By way of example, referring to FIG. 4, SCR status detection logic 110 associated with the FGPA board 98a, which is coupled to the SCRs 80k and 80l by way of the FHVA boards 100a and 100b, may provide SCR conduction status signals 126 corresponding to each of the SCRs 80k and 80l. Similarly, the FGPA board 98c may provide SCR conduction status signals 126 for each of the SCRs 80m-80p.

Figure 6:
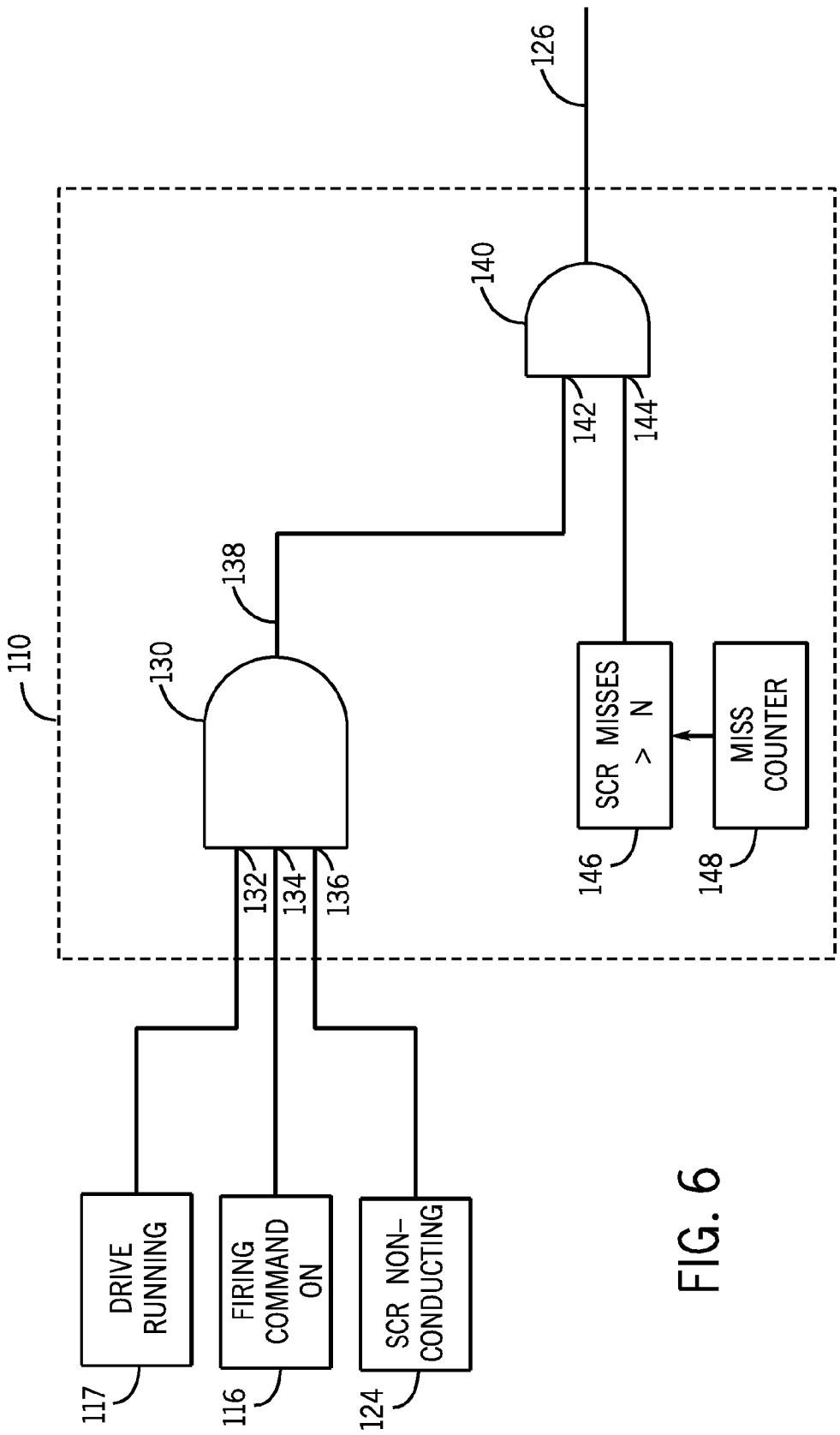
FIG. 6 is a logic diagram depicting an embodiment of the detection logic shown in FIG. 5.

FIG. 6 illustrates one embodiment of the SCR status detection logic 110 that may be implemented as part of the FGPA board 98. As shown, the illustrated SCR status detection logic 110 may include a first AND gate 130. The first AND gate 130 may be a three-input AND gate having inputs 132, 134, and 136 that receive the signals 117, 116, and 124, respectively. Accordingly, the AND gate 130 may perform a Boolean AND operation based on the states of the signals 117, 116, and 124. In the depicted embodiment, the signal 117 may have a logical state of 1 when the static starter drive is running and a logic state of 0 when the static starter drive is not running. Additionally, the signal 116 may indicate a logical state of 1 when an SCR firing command is on and a logical state of 0 when the SCR firing command is off, and the SCR conducting/non-conducting status signal 124 provided by the FHVA board 100 may indicate a logic state of 1 when the SCR 80 is not conducting, and a logical state of 0 when the SCR 80 is conducting.

Therefore, in the present embodiment, the output 138 of the AND gate 130 may output a logical value of 1 in the case that the signal 117 (drive running signal), the signal 116 (SCR firing command is on), and the signal 124 (SCR conducting/non-conducting signal) all have logical states of 1, which may indicate that the SCR 80 is non-conducting. That is, when the static starter drive is running (signal 117 shows a 1) and a firing command is received (signal 116 shows a 1), the SCR to which the firing command is sent is expected to be conductive (signal 124 is expected to show a 0), which results in the output 138 of the AND gate 130 being a 0. However, if the SCR 80 is non-conducting, then the signal 124 will show a logical state of 1 and the resulting output 138 will also show a logical state of 1, thereby indicating a non-conductive state of the SCR 80.

As further shown in FIG. 6, the detection logic 110 may include a second AND gate 140 having inputs 142 and 144. The output 138 may be provided to the input 142, and the input 144 may receive a signal 146 that indicates a number of times, N, that the SCR 80 repeatedly fails to conduct in response to consecutive firing commands For instance, in one embodiment, the SCR 80 may receive six pulses per second, wherein N is equal to 6. The detection logic 110 may include a counter 148 that may track the number of times of SCR 80 does not fire (e.g., misses) in response to consecutive firing commands and, if the SCR 80 fails to conduct more than N times (e.g., N=6), the signal 146 may transition to a logical state of 1. As will be appreciated, in other embodiments, N may be set to different values (e.g., 12, 18, etc.). Thus, if the SCR 80 misses less than N times before recovering and conducting properly, the counter 148 may be reset. Accordingly, the illustrated detection logic 110 provides the SCR conduction status signal 126 as the output of the AND gate 140, wherein the SCR conduction status signal 126 provides a logical state of 1 if the SCR 80 has become non-conducting for N consecutive firing commands Further, while implemented using AND logic gates in the present embodiment, it should be appreciated that the detection logic 110 may be implemented using any other suitable or equivalent logic.

Technical effects of this disclosure include providing the capability to quickly and easy identify and troubleshoot specific non-conducting solid state switches in a power conversion circuit, such as one implemented in a static starter drive. For instance, since each switching device (e.g., SCR 80) of the power conversion module is monitored by respective status detection logic 110, the states of the switching devices may be fed back to the control logic of the static starter drive, which may enable an operator to quickly identify and address non-conducting switches while also reducing equipment downtime in the event that one or more switches become non-conducting.

As will be understood, the various techniques described above and relating to the monitoring and detecting of the conductive state of solid state semiconductor switches are provided herein by way of example only. Accordingly, it should be understood that the present disclosure should not be construed as being limited to only the examples provided above. Indeed, a number of variations of the detection logic and techniques set forth above may exist. Further, it should be appreciated that the above-discussed techniques may be implemented in any suitable manner. For instance, the detection logic 110 of the FGPA boards 98 may be implemented using hardware (e.g., suitably configured circuitry), software (e.g., via a computer program including executable code stored on one or more tangible computer readable medium), or via using a combination of both hardware and software elements.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A system comprising:
   a static starter system comprising detection logic configured to indicate a conductive state of a solid state semiconductor device, wherein the detection logic comprises:
   a first logic gate comprising:
   a first input configured to receive a first input signal, wherein the first input signal indicates a state of the static starter system, and wherein the first input signal has a first logical state if the static starter system is not running and a second logical state if the static starter system is running;
   a second input configured to receive a second input signal, wherein the second input signal indicates a state of a gate firing command being applied to the solid state semiconductor device, wherein the second input signal has a first logical state if the gate firing command is in an off state and a second logical state if the gate firing command is in an on state; and a third input configured to receive a third input signal, wherein the third input signal indicates whether the solid state semiconductor device is conducting, and wherein the third input signal has a first logical state if the solid state semiconductor device is conducting and a second logical state if the solid state semiconductor device is not conducting;

wherein the first logic gate is configured to evaluate the first, second, and third input signals and to provide a first output signal that indicates conductivity of the solid state semiconductor device in response to the gate firing command.

2. The system of claim 1, wherein the detection logic comprises a second logic gate, wherein the second logic gate comprises:

a fourth input configured to receive the first output signal from the first logic gate; and a fifth input configured to receive a fourth input signal, wherein the fourth signal indicates if the solid state semiconductor device repeatedly fails to conduct in response to a particular number of consecutive gate firing commands, and wherein the fourth input signal has a first logical state if the semiconductor device is conducting in response to the consecutive gate firing commands;

wherein the second logic gate is configured to evaluate the states of the first output signal and the fourth input signal to provide a second output signal that indicates the conductive state of the solid state semiconductor device.

3. The system of claim 2, wherein the detection logic comprises a counter configured to maintain a count of a number of times the solid state semiconductor device repeatedly fails to conduct in response to the consecutive gate firing commands by incrementing the count for each time that the solid state semiconductor device fails to conduct.

4. The system of claim 3, wherein if the count maintained by the counter exceeds a threshold number, the fourth input signal transitions from the first logical state to a second logical state.

5. The system of claim 4, wherein the counter is configured to reset the count if the solid state semiconductor device conducts in response to one of the consecutive gate firing commands before the threshold number is reached.

6. The system of claim 4, wherein the first and second logical states of each of the first, second, third, and fourth input signals comprise a logical 0 state and a logical 1 state, respectively, and wherein the first logic gate and the second logic gate comprise AND logic gates.

7. The system of claim 1, wherein the solid state semiconductor device comprises a thyristor.

8. The system of claim 1, comprising:

a gas turbine;

an electrical generator; and the static starter system comprises a static starter configured to provide a variable frequency AC signal to drive the electrical generator during a starting sequence of the gas turbine, wherein the static starter comprises:

a power conversion module comprising a plurality of solid state switches configured to receive an initial AC input signal, convert the AC input signal into a DC signal, and convert the DC signal into the variable frequency AC signal; and control logic configured to provide gate firing commands to each of the plurality of solid state switches;

wherein each of the plurality of solid state switches is coupled to a respective status detection circuit configured to determine if a solid state switch transitions to a conductive state when a gate firing command is sent to the solid state switch while the static starter is running during the starting sequence.

9. The system of claim 1, wherein the static starter system comprises:

a power conversion module comprising a source bridge converter comprising a first set of solid state switches and a load bridge converter comprising a second set of solid state switches, wherein the source bridge converter is configured to receive and convert a three-phase AC input signal into a DC signal and the load bridge converter is configured to receive and convert the DC signal into a variable frequency three-phase AC signal;

control logic comprising:

a controller configured to generate gate firing commands for each of the first and second sets of solid state switches;

gate pulse amplifier circuitry configured to generate gate pulses for each of the first and second sets of solid state switches based on the gate firing commands, wherein the gate pulse amplifier circuitry comprises, for each solid state switch, detection logic configured to monitor a state of a respective solid state switch, wherein the detection logic comprises:

an AND logic gate having a first input configured to receive a first input signal indicating an operating state of the static starter, a second input configured to receive a second input signal indicating a state of the gate firing command sent to the solid state switch, and a third input configured to receive a third input signal indicating the conductivity of the solid state switch, wherein the AND logic gate provides an output signal based on the states of the first, second, and third input signals, and wherein the detection logic provides a status signal being indicative of a conductive state of the solid state switch, the status signal being based at least partially upon the output signal.

10. A system comprising:

a static starter system comprising detection logic configured to indicate a conductive state of a solid state semiconductor device, wherein the static starter system is configured to receive feedback signals confirming a control action of the static starter system comprising a first input signal, a second input signal, and a third input signal, and wherein the detection logic comprises:

a first logic gate comprising:

a first input configured to receive the first input signal, wherein the first input signal indicates a state of the static starter system;

a second input configured to receive the second input signal, wherein the second input signal indicates a state of a gate firing command being applied to the solid state semiconductor device; and a third input configured to receive the third input signal, wherein the third input signal indicates whether the solid state semiconductor device is conducting;

wherein the first logic gate is configured to evaluate the first, second, and third input signals and to provide a first output signal that indicates conductivity of the solid state semiconductor device in response to the gate firing command.

11. The system of claim 10, wherein the first input signal has a first logical state if the static starter system is not running and a second logical state if the static starter system is running;

wherein the second input signal has a first logical state if the gate firing command is in an off state and a second logical state if the gate firing command is in an on state; and wherein the third input signal has a first logical state if the solid state semiconductor device is conducting and a second logical state if the solid state semiconductor device is not conducting.

12. The system of claim 10, wherein the detection logic comprises a second logic gate, wherein the second logic gate comprises:

a fourth input configured to receive the first output signal from the first logic gate; and a fifth input configured to receive a fourth input signal, wherein the fourth signal indicates if the solid state semiconductor device repeatedly fails to conduct in response to a particular number of consecutive gate firing commands, and wherein the fourth input signal has a first logical state if the semiconductor device is conducting in response to the consecutive gate firing commands;

wherein the second logic gate is configured to evaluate the states of the first output signal and the fourth input signal to provide a second output signal that indicates the conductive state of the solid state semiconductor device.

13. The system of claim 10, wherein the solid state semiconductor device comprises a thyristor, a silicon controlled rectifier, a gate turn-off thyristor, a triode AC switch, a MOS controlled thyristor, an integrated gate commutated thyristor, a static induction thyristor, or any combination thereof.

14. The system of claim 10, wherein the static starter system comprises:

a power conversion module comprising a plurality of the solid state semiconductor devices configured to receive an initial AC input signal, convert the AC input signal into a DC signal, and convert the DC signal into the variable frequency AC signal; and control logic configured to provide gate firing commands to each of the plurality of solid state semiconductor devices;

wherein each of the plurality of solid state semiconductor devices is coupled to a respective status detection circuit comprising the detection logic, and wherein the detection logic is configured to determine if a solid state semiconductor device transitions to a conductive state when a gate firing command is sent to the solid state semiconductor device while the static starter system is running during the starting sequence.

15. The system of claim 14, wherein the initial AC input signal comprises a three-phase AC input signal.

16. The system of claim 10, comprising:

a gas turbine;

an electrical generator; and the static starter system comprises a static starter configured to provide a variable frequency AC signal to drive the electrical generator during a starting sequence of the gas turbine, wherein the static starter comprises:

a power conversion module comprising a plurality of the solid state semiconductor devices configured to receive an initial AC input signal, convert the AC input signal into a DC signal, and convert the DC signal into the variable frequency AC signal; and control logic configured to provide gate firing commands to each of the plurality of solid state semiconductor devices;

wherein each of the plurality of solid state devices is coupled to a respective status detection circuit comprising the detection logic, and wherein the detection logic is configured to determine if a solid state semiconductor device transitions to a conductive state when a gate firing command is sent to the solid state semiconductor device while the static starter is running during the starting sequence.

17. The system of claim 16, wherein the power conversion module comprises a DC link reactor configured to receive and smooth the DC signal.

18. The system of claim 16, wherein during the starting sequence, the static starter supplies the variable frequency AC signal to a stator of the electrical generator and a field reference voltage to a rotor of the electrical generator, and wherein the electrical generator is configured to operate as a synchronous motor in response to the variable frequency AC signal and the field reference voltage to drive a shaft of the gas turbine during the starting sequence.

19. The system of claim 16, wherein the static start electrically disengages from the electrical generator when the gas turbine achieves a self-sustaining operating speed.

20. the system of claim 10, wherein the solid state semiconductor device comprises a thyristor.

21. A method comprising:

receiving a first input signal indicating a state of a static starter system, wherein the first input signal has a first logical state if the static starter system is not running and a second logical state if the static starter system is running;

receiving a second input signal indicating a state of a gate firing command being applied to a solid state semiconductor device within the state starter system, wherein the second input signal has a first logical state if the gate firing command is in an off state and a second logical state if the gate firing command is in an on state;

receiving a third input signal indicating whether the solid state semiconductor is conducting, wherein the third input signal has a first logical state if the solid state semiconductor device is conducting and a second logical state if the solid state semiconductor is not conducting;

evaluating the first, second, and third input signals; and generating a first output signal indicating conductivity of the solid state semiconductor device in response to the gate firing command.

22. The method of claim 21, comprising:

receiving a fourth input signal indicating whether the solid state semiconductor device repeatedly fails to conduct in response to a particular number of consecutive gate firing commands, wherein the fourth input signal has a first logical state if the solid state semiconductor device is not conducting in response to the gate firing commands;

evaluating the first output signal and the fourth input signal; and generating a second output signal that indicates the conductive state of the solid state semiconductor device.

* * * * *